United States Patent
Ueno et al.

(10) Patent No.: US 9,960,452 B2
(45) Date of Patent: May 1, 2018

(54) METHOD OF PRODUCING NONAQUEOUS SECONDARY BATTERY

(71) Applicant: TOYOTA JIDOSHA KABUSHIKI KAISHA, Toyota-shi, Aichi-ken (JP)

(72) Inventors: Yukiyoshi Ueno, Toyota (JP); Junko Ohira, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 197 days.

(21) Appl. No.: 15/033,371

(22) PCT Filed: Nov. 6, 2014

(86) PCT No.: PCT/IB2014/002344
§ 371 (c)(1),
(2) Date: Apr. 29, 2016

(87) PCT Pub. No.: WO2015/068017
PCT Pub. Date: May 14, 2015

(65) Prior Publication Data
US 2016/0261006 A1   Sep. 8, 2016

(30) Foreign Application Priority Data
Nov. 11, 2013   (JP) .................................. 2013-233376

(51) Int. Cl.
*G01R 31/28* (2006.01)
*H01M 10/0587* (2010.01)
(Continued)

(52) U.S. Cl.
CPC ....... *H01M 10/0587* (2013.01); *H01M 2/162* (2013.01); *H01M 2/1653* (2013.01);
(Continued)

(58) Field of Classification Search
CPC ............. H01M 10/0525; H01M 10/48; H01M 10/0568; H01M 10/058; H01M 10/446;
(Continued)

(56) References Cited

U.S. PATENT DOCUMENTS 5,539,318 A * 7/1996 Sasaki ............... G01R 19/16542
324/427
8,945,766 B2 * 2/2015 Yoshida ................ H01M 4/043
429/211

FOREIGN PATENT DOCUMENTS

JP         2800220 B2    9/1998
JP     2012-084322 A    4/2012
(Continued)

*Primary Examiner* — Thiem Phan
(74) *Attorney, Agent, or Firm* — Sughrue Mion, PLLC

(57) ABSTRACT

A method of producing a nonaqueous secondary battery includes: preparing an electrode body (S10); constructing a battery assembly with the electrode body and a nonaqueous electrolyte (S20); initially charging the battery assembly (S30); aging the battery assembly at 40° C. or higher (S40); adjusting an SOC of the battery assembly (S60), wherein, the adjusting the SOC is performed such that a residual capacity percentage of the battery assembly is 11.5% or more and 14% or less; self-discharging the battery assembly and measuring a voltage drop amount (S70); and determining a quality of the battery assembly based on the voltage drop amount (S80).

7 Claims, 8 Drawing Sheets

(51) Int. Cl.

| | |
|---|---|
| *H01M 10/04* | (2006.01) |
| *H01M 10/0525* | (2010.01) |
| *H01M 10/058* | (2010.01) |
| *H01M 10/44* | (2006.01) |
| *H01M 10/48* | (2006.01) |
| *H01M 10/615* | (2014.01) |
| *H01M 2/16* | (2006.01) |
| *H01M 2/26* | (2006.01) |
| *H01M 2/30* | (2006.01) |
| *H01M 4/04* | (2006.01) |
| *H01M 4/131* | (2010.01) |
| *H01M 4/133* | (2010.01) |
| *H01M 4/1391* | (2010.01) |
| *H01M 4/505* | (2010.01) |
| *H01M 4/525* | (2010.01) |
| *H01M 4/587* | (2010.01) |
| *H01M 4/62* | (2006.01) |
| *H01M 4/66* | (2006.01) |
| *H01M 10/0567* | (2010.01) |
| *H01M 10/0568* | (2010.01) |
| *H01M 10/0569* | (2010.01) |
| *H01M 4/02* | (2006.01) |

(52) U.S. Cl.
CPC ......... *H01M 2/1686* (2013.01); *H01M 2/263* (2013.01); *H01M 2/305* (2013.01); *H01M 4/043* (2013.01); *H01M 4/0404* (2013.01); *H01M 4/131* (2013.01); *H01M 4/133* (2013.01); *H01M 4/1391* (2013.01); *H01M 4/505* (2013.01); *H01M 4/525* (2013.01); *H01M 4/587* (2013.01); *H01M 4/622* (2013.01); *H01M 4/623* (2013.01); *H01M 4/625* (2013.01); *H01M 4/661* (2013.01); *H01M 10/049* (2013.01); *H01M 10/058* (2013.01); *H01M 10/0525* (2013.01); *H01M 10/0567* (2013.01); *H01M 10/0568* (2013.01); *H01M 10/0569* (2013.01); *H01M 10/446* (2013.01); *H01M 10/48* (2013.01); *H01M 10/615* (2015.04); *H01M 2004/021* (2013.01); *H01M 2004/027* (2013.01); *H01M 2004/028* (2013.01); *H01M 2220/20* (2013.01); *Y02T 10/7011* (2013.01); *Y10T 29/49004* (2015.01); *Y10T 29/49108* (2015.01)

(58) Field of Classification Search
CPC ............ H01M 2220/20; Y02T 10/7011; Y02T 10/7005; Y10T 29/49004; Y10T 29/49108; G01R 31/3606; G01R 19/16542; G01R 31/36
USPC .......................... 29/593, 623.1, 623.3, 623.4
See application file for complete search history.

(56) References Cited

FOREIGN PATENT DOCUMENTS

| | | |
|---|---|---|
| JP | 2012-084346 A | 4/2012 |
| JP | 2015-095332 A | 5/2015 |
| JP | 2015-095333 A | 5/2015 |
| WO | 2015/068013 A1 | 5/2015 |

\* cited by examiner

METHOD OF PRODUCING NONAQUEOUS SECONDARY BATTERY

BACKGROUND OF THE INVENTION

1. Field of the Invention

The invention relates to a method of producing a battery including a nonaqueous electrolyte (a nonaqueous secondary battery).

2. Description of Related Art

A nonaqueous secondary battery such as a lithium-ion battery or the like is lighter in weight and higher in energy density than a conventional battery. Thus, in recent years, nonaqueous secondary batteries are preferably used as vehicle-mounted high-output power supplies or the like. In the production of batteries of this kind, it is typical that an electrode body is first made of a positive electrode and a negative electrode and then a battery assembly is constructed with the electrode body and a nonaqueous electrolyte. Then, a specified initial charge (conditioning) and aging under high temperatures are performed to the battery assembly thus constructed. Thereafter, the performance is tested (e.g., a self-discharge test).

In the self-discharge test, the generation of a minute internal short-circuit in the battery assembly is determined by leaving the battery assembly having an adjusted state of charge (SOC) alone for a specified period of time and measuring a voltage drop amount during this period (self-discharge). However, it is sometimes the case that, even after adjustment of the SOC, a voltage of the aged battery assembly is not stabilized for a while and continues to rise or fall (hereinafter, this period will be simply referred to as a "voltage instability period"). For that reason, in order to accurately conduct a test (determination), there is a need to wait until the voltage of the battery assembly is sufficiently stabilized. In the production method of the related art, the time required for production (typically, the initial period of the self-discharge test, i.e., the voltage instability period) tends to become longer. Examples of a technique for addressing this problem include Japanese Patent Application Publication No. 2012-084346 (JP 2012-084346 A) which recites that a self-discharge test period (particularly, a voltage instability period) can be shortened by forcedly discharging an aged battery after the battery is kept in a high SOC state for 1 to 7 days and by setting a difference in voltages available before and after the forced discharging to fall within a predetermined range.

However, the research conducted by the inventors revealed that, in the method disclosed in JP 2012-084346 A, the aforementioned battery voltage fluctuation often lasts for a long period of time (e.g., 5 days or longer) depending on, e.g., the condition of the electrode lot or an aging condition. This tendency was particularly conspicuous in a battery which is required to generate high output power in a low SOC region (e.g., a region where an SOC is 30% or less), e.g., a battery mounted to a plug-in hybrid vehicle (PHV). Accordingly, from the viewpoints of productivity, work efficiency and costs, there is a demand to further shorten a self-discharge test period (e.g., a voltage instability period) without reducing test accuracy.

SUMMARY OF THE INVENTION

The invention provides a method of producing a highly reliable battery within a short period of time by shortening a voltage instability period during a self-discharge test.

The inventors have conducted research on the causes of voltage rise (or voltage drop) during the self-discharge test and have found that the configuration of an electrode body has some relation to the causes of voltage rise (or voltage drop). That is to say, in a typical configuration of a nonaqueous secondary battery, in order to suppress precipitation of charge carriers (metal precipitation) in a negative electrode, a surface area of a negative electrode active material layer (an area over which an active material layer is formed) is set to be larger than a surface area of a positive electrode active material layer. In other words, the negative electrode active material layer includes a portion opposite to the positive electrode active material layer (hereinafter simply referred to as an "opposite portion") and a portion not opposing the positive electrode active material layer (hereinafter simply referred to as a "non-opposite portion"). In the negative electrode active material layer of this configuration, if charge carriers (typically, lithium ions) are stored in the opposite portion by initial charging (conditioning) to lower an electric potential of the opposite portion, the concentration relaxation of the charge carriers occurs in the negative electrode active material layer during the aging performed thereafter. Then, the charge carriers gradually move toward the non-opposite portion having a relatively high electric potential. If the battery is left alone in a high electric potential (high SOC) state, the aforementioned concentration relaxation further progresses and the charge carriers move toward an end portion and a deep portion of the non-opposite portion. If the battery is discharged thereafter, the charge carriers in the opposing portion are released and the electric potential of the opposite portion is increased. In contrast, the charge carriers stored in the non-opposite portion are not released but remain in the non-opposite portion. For that reason, the electric potential of the non-opposite portion becomes relatively lower than the electric potential of the opposite portion. If this electric potential irregularity (polarization state) occurs in the negative electrode active material layer, the charge carriers remaining in the non-opposite portion are diffused to the opposite portion. The battery voltage continues to rise until the electric potential difference is removed. Conversely, if the electric potential of the opposite portion is relatively higher than the electric potential of the non-opposite portion, the charge carriers are diffused from the opposite portion toward the non-opposite portion. The battery voltage continues to drop until the electric potential difference is removed.

Under the circumstances, the inventors have conducted research to find a way of preventing (or alleviating) the electric potential irregularity in the negative electrode active material layer in order to shorten the voltage instability period and have concluded that it is important to control a residual capacity percentage of a battery assembly prior to the self-discharge test.

A method of producing a nonaqueous secondary battery according to one aspect of the invention includes: preparing an electrode body which includes a positive electrode having a positive electrode active material layer and a negative electrode having a negative electrode active material layer, wherein a surface area of the negative electrode active material layer is larger than a surface area of the positive electrode active material layer and wherein the negative electrode active material layer includes an opposite portion which is opposite to the positive electrode active material layer and a non-opposite portion which is not opposite to the positive electrode active material layer; constructing a battery assembly with the electrode body and a nonaqueous electrolyte; initially charging the battery assembly; aging the battery assembly at 40° C. or higher; adjusting a residual capacity percentage of the battery assembly to 11.5% or more and 14% or less; self-discharging the battery assembly and measuring a voltage drop amount after the adjusting the residual capacity percentage; and determining a quality of the battery assembly based on the voltage drop amount.

In the subject specification, the term "residual capacity percentage" refers to a value calculated by the following equation I from a total sum of charging capacities ($\Sigma$ charging capacities) and a total sum of discharging capacities ($\Sigma$ discharging capacities) from the constructing the battery assembly to the adjusting an SOC.

$$\text{Residual capacity percentage (\%)} = \frac{\left(\sum \text{charging capacities} - \sum \text{discharging capacities}\right)}{\sum \text{charging capacities}} \times 100 \quad \text{(I)}$$

In the production method disclosed herein, a self-discharge test is performed after the residual capacity percentage of the battery assembly is adjusted to fall within the aforementioned range. This makes it possible to prevent generation of the aforementioned electric potential irregularity (polarization state) in the negative electrode active material layer after the SOC is adjusted (after the residual capacity percentage is adjusted). Accordingly, as compared with the related art, it is possible to shorten the voltage instability period and to finish the self-discharge test within a shorter period of time. According to the research conducted by the inventors, the voltage instability period can be reduced to 0 days (can be almost eliminated). Moreover, the production method disclosed herein is relatively simple because it is only necessary to adjust the residual capacity percentage of the battery assembly to fall within the aforementioned range. This is very meaningful from the viewpoints of productivity, work efficiency and costs.

The production method according to one aspect of the invention may further include forcedly discharging the battery assembly between the aging and the adjusting the residual capacity percentage. During the aging, the battery assembly may be kept at 60° C. or higher. During the forced discharging, the battery assembly may be kept in a temperature region of 20° C. or higher and 55° C. or lower. By performing the aging at 60° C. or higher and by forcedly discharging the battery assembly while keeping the battery assembly at the relatively high temperature, the diffusibility of the charge carriers is enhanced and the polarization state in the negative electrode active material layer can be alleviated. This makes it possible to further shorten the voltage instability period after adjusting the SOC. Furthermore, by setting the time for keeping the battery assembly at the relatively high temperature for a relatively long period of time, it is possible to form a homogeneous film on a surface of the negative electrode and to reduce variations of measured values during the self-discharge test. This makes it possible to clearly identify a defective product (a battery assembly in which short-circuits are generated) and to accurately perform non-defective product determination. Accordingly, it is possible to produce a highly reliable battery within a short period of time and to realize the effects of the invention at a higher level.

In the production method according to one aspect of the invention, the battery assembly may be discharged to 1.6 V or higher and 2.3 V or lower during the forced discharging. If an arrival voltage (typically, a final voltage) is set to fall within this range, the electric potential difference between the opposite portion and the non-opposite portion grows larger and it becomes easy for the charge carriers remaining in the non-opposite portion to escape from the non-opposite portion. This makes it possible to suitably alleviate the electric potential irregularity in the negative electrode active material layer. As a result, it is possible to further shorten the voltage instability period after adjusting the SOC. Accordingly, it is possible to finish the self-discharge test within a shorter period of time and to realize the effects of the invention at a higher level.

In the production method according to one aspect of the invention, the period from an end of the aging to a start of the forced discharging may be 24 hours or shorter. If the period from the end of the aging to the start of the forced discharging is set to fall within this time, it is possible to restrain the charge carriers from moving toward an end portion or a deep portion of the non-opposite portion of the negative electrode active material layer. Thus, it becomes easy for the charge carriers to escape from the non-opposite portion. This makes it possible to reduce the electric potential irregularity in the negative electrode active material layer. As a result, it is possible to further shorten the voltage instability period after adjusting the SOC.

In the production method according to one aspect of the invention, when the adjustment of the residual capacity percentage is finished, the SOC of the battery assembly may be adjusted to 10% or less. By evaluating the self-discharge characteristics in this SOC range, it is possible to precisely evaluate a battery performance in a low SOC region (e.g., a region where the SOC is 30% or less). This is particularly useful in, e.g., a battery mounted to a plug-in hybrid vehicle (PHV) which may require a high power density over a wide SOC region.

In the production method according to one aspect of the invention, the battery assembly may be charged to 65% or more and 110% or less by SOC during the initial charging. Furthermore, the aging may be performed for at least 5 hours. By charging the battery assembly to the aforementioned SOC range, a part of a nonaqueous electrolyte (e.g., a nonaqueous solvent or a nonaqueous film-forming agent) can be suitably reduced and decomposed in the negative electrode. Thus, a film (an SEI film; Solid Electrolyte Interface film) composed of a decomposition product of the nonaqueous electrolyte can be suitably formed on the surface of the negative electrode active material layer. This makes it possible to enhance the durability of the battery assembly. Moreover, by keeping the battery assembly at a high temperature of 40° C. or higher for at least 5 hours, the SEI film formed on the surface of the negative electrode active material layer can be modified to a higher quality and/or a more homogeneous film. This makes it possible to effectively reduce a resistance of the negative electrode. As a result, it is possible to reduce variations of measured values during the self-discharge test and to more accurately perform a non-defective product determination.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Preferred embodiments of the invention will now be described with reference to the accompanying drawings. It should be noted that matters necessary for carrying out the invention other than those specifically referred to in the subject specification may be suitably grasped based on the related art, in this field. The embodiments may be carried out on the basis of the content disclosed herein and the common technical knowledge in this field.

Figure 1:
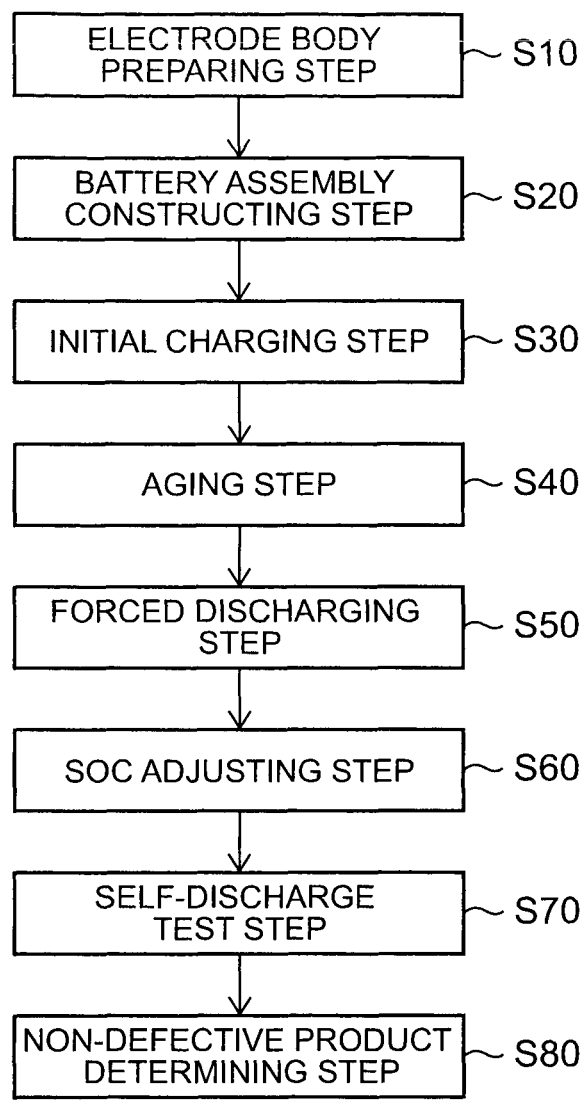
FIG. 1 is a flowchart of a production method according to one embodiment of the invention.
Figure 2A:
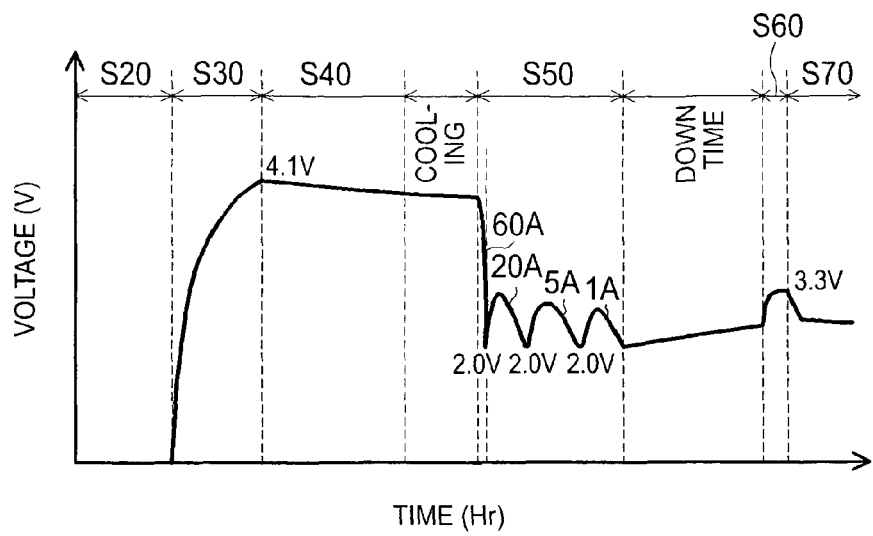
FIG. 2A is a graph illustrating a voltage change of a battery assembly in the production method according to one embodiment of the invention.
Figure 2B:
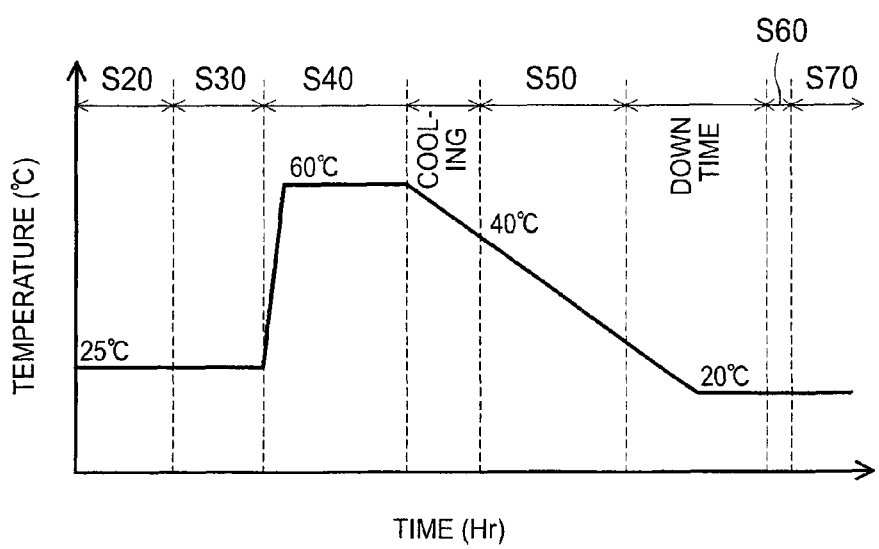
FIG. 2B is a graph illustrating a temperature change of a battery assembly in the production method according to one embodiment of the invention.

A production method disclosed herein includes: an electrode body preparing step S10; a battery assembly constructing step S20; an initial charging step S30; an aging step S40; an SOC (State Of Charge) adjusting step S60; a self-discharge test step S70; and a non-defective product determining step S80. FIG. 1 shows a flowchart of the production method according to one embodiment of the invention. The production method shown in FIG. 1 further includes a forced discharging step S50 between the aging step S40 and the SOC adjusting step S60. FIG. 2A illustrates a voltage change of a battery assembly according to one embodiment of the invention. FIG. 2B illustrates a temperature change of a battery assembly according to one embodiment of the invention. The respective steps will now be described one after another.

In the subject specification, the term "temperature of a battery assembly" refers to a value measured by attaching a thermocouple to an outer surface (a bottom portion) of a battery case. In, the subject specification, the term "ordinary temperature range", indicates 20° C.±10° C. (namely, 10 to 30° C., typically 15 to 30° C., e.g., 20 to 25° C.).

[S10: Electrode Body Preparing Step]

In this step, an electrode body that includes a positive electrode having a positive electrode active material layer and a negative electrode having a negative electrode active material layer is prepared. This electrode body is fabricated by typically stacking the positive electrode and the negative electrode opposite to each other with a separator interposed therebetween.

Typically, the positive electrode is of a type in which a positive electrode active material layer containing a positive electrode active material is fixed onto a positive electrode current collector. As the positive electrode current collector, it is possible to suitably employ a conductive member made of a metal superior in electrical conductivity (e.g., aluminum, nickel, titanium or the like). As the positive electrode active material, it is possible to employ one or more kinds of materials which are known to be capable of being used as a positive electrode active material of a nonaqueous secondary battery. Preferred examples of the positive electrode active material include layered or spinel-type lithium composite metal oxides (e.g., $LiNiO_2$, $LiCoO_2$, $LiFeO_2$, $LiMn_2O_4$, $LiNi_{0.33}Co_{0.33}Mn_{0.33}O_2$, $LiNi_{0.38}Co_{0.32}Mn_{0.30}O_2$, $LiNi_{0.5}Mn_{1.5}O_4$, $LiCrMnO_4$, $LiFePO_4$ or the like). Among them, from the viewpoints of thermal stability and energy density, it is possible to suitably use lithium-nickel-cobalt-manganese composite oxides of a layered structure (typically, a layered rock salt structure) which contain, as constituent elements, Li, Ni, Co and Mn. If necessary, the positive electrode active material layer may contain, in addition to this positive electrode active material, one or two kinds of materials that can be used as components of a positive electrode active material layer in an ordinary nonaqueous secondary battery. Examples of these materials include a conductive material and a binder. As the conductive material, it is possible to suitably use a carbon material such as, e.g., various kinds of carbon black (e.g., acetylene black or Ketjen black), activated carbon, graphite or carbon fibers. As the binder, it is possible to suitably use a polymer material such as, e.g., polyvinylidene fluoride (PVdF) or polyethylene oxide (PEO). In addition, various kinds of additives (e.g., an inorganic compound that generates a gas when overcharged, a dispersant and a thickener) may be added unless they severely impair the effects of the invention.

Typically, the negative electrode is of a type in which a negative electrode active material layer containing a negative electrode active material is fixed onto a negative electrode current collector. As the negative electrode current collector, it is possible to suitably employ a conductive member made of a metal superior in electrical conductivity (e.g., copper, nickel, titanium or the like). As the negative electrode active material, it is possible to employ one or more kinds of materials which are known to be capable of being used as a negative electrode active material of a nonaqueous secondary battery. Preferred examples of the negative electrode active material include a carbon material such as graphite, hard graphitizable carbon (hard carbon), easily graphitizable carbon (soft carbon), carbon nanotube, or a material having a combined structure thereof. Among them, it is preferable to use amorphous coat graphite (graphite particles whose surfaces are coated with amorphous carbon). In one preferred form of the amorphous coat graphite, a BET specific surface area is 5 m²/g or less (e.g., 2.5 m²/g to 5 m²/g). In another preferred form of the amorphous coat graphite, a cover ratio (coat amount) of amorphous carbon is less than 5% (typically, 3% or less, e.g., 0.5% to 3%). This makes it possible to realize superior battery characteristics (e.g.; an input-output characteristic), e.g., in a low SOC region (e.g., a region where an SOC is 30% or less). If necessary, the negative electrode active material layer may contain, in addition to the negative electrode active material, one or two kinds of materials that can be used as components of a negative electrode active material layer in an ordinary nonaqueous secondary battery. Examples of these materials include a binder. As the binder, it is possible to suitably use a polymer material such as, e.g., styrene-butadiene rubber (SBR), polyvinylidene fluoride (PVdF), or polytetrafluoroethylene (PTFE). In addition, various kinds of additives (e.g., a thickener, a dispersant and a conductive material) may be added unless they severely impair the effects of the invention. As the thickener, it is possible to suitably use, e.g., carboxymethyl cellulose (CMC), methyl cellulose (MC) or the like.

In the invention disclosed herein, the surface area of the negative electrode active material layer is larger than the surface area of the positive electrode active material layer. In other words, the negative electrode active material layer includes a portion opposite to the positive electrode active material layer (an opposite portion) and a portion not opposing the positive electrode active material layer (a non-opposite portion). As described above, if the battery assembly is provided with the electrode body of this configuration, there is a tendency that the period required in the self-discharge test (typically, the voltage instability period after the adjustment of the SOC) generally becomes longer. For that reason, the application of the invention is effective.

Although not specifically limited, an initial capacity ratio of the positive and negative electrodes, namely a capacity ratio ($C_N/C_P$) calculated as a ratio of an initial charging capacity ($C_N$) of the negative electrode to an initial charging capacity ($C_P$) of the positive electrode, can be set at, e.g., 1.0 to 2.1. This makes it possible to realize a high energy density and a superior cycle characteristic.

Just like an ordinary nonaqueous secondary battery, a porous sheet, a non-woven fabric or the like can be used as the separator. Preferred examples of the separator include a porous resin sheet which contains a resin such as polyethylene (PE), polypropylene (PP), polyester or the like. Furthermore, the separator may be configured by a heat-resistant separator that includes an organic porous layer containing the porous sheet, the non-woven fabric or the like and a porous heat-resistant layer (porous heat-resistant layers) held on a single surface or double surfaces (typically, single surface) of the organic porous layer. The porous heat-resistant layer may be a layer which contains, e.g., an inorganic material (e.g., inorganic fillers such as alumina particles or the like) and a binder. Alternatively, the porous heat-resistant layer may be a layer which contains resin particles having an insulating property (e.g., particles of polyethylene, polypropylene or the like). In a nonaqueous secondary battery including a solid-state electrolyte or a gel-state electrolyte (e.g., a lithium polymer battery), it may be possible to employ a configuration in which a nonaqueous electrolyte serves as a separator.

[S20: Battery Assembly Constructing Step]

In this step, typically in an ordinary temperature range, a battery assembly is constructed by bringing the electrode body and the nonaqueous electrolyte into a battery case. As the battery case, it is possible to suitably employ a case made of a lightweight metallic material such as, e.g., aluminum or steel. In the subject specification, the term "battery assembly" refers to a battery assembly obtained by assembling the electrode body and the nonaqueous electrolyte in the steps preceding the initial charging step. The kind and configuration of a battery are not particularly limited. For example, the battery assembly may be the one available before or after sealing the battery case.

Typically, the nonaqueous electrolyte has a liquid-phase configuration in which a supporting salt is dissolved or dispersed in a nonaqueous solvent. Alternatively, the nonaqueous electrolyte may be a solid-state one (typically, a so called gel-state one) obtained by adding a polymer to the liquid-phase configuration. The nonaqueous solvent is not particularly limited. As the nonaqueous solvent, it is possible to use an organic solvent such as carbonates, ethers, esters, nitriles, sulfones, lactones or the like, which are used as the nonaqueous electrolyte of an ordinary nonaqueous secondary battery. With a view to forming a high-quality film on the surface of the negative electrode active material, it is possible to suitably use carbonates. Specific examples of the carbonates include ethylene carbonate (EC), propylene carbonate (PC), diethyl carbonate (DEC), dimethyl carbonate (DMC), ethyl methyl carbonate (EMC) or the like. The supporting salt is not particularly limited as long as it contains charge carriers (e.g., lithium ions, sodium ions, magnesium ions or the like)(lithium ions in case of a lithium-ion secondary battery). It is possible to appropriately select and use those supporting salts as used in an ordinary nonaqueous secondary battery. For example, if the charge carriers are lithium ions, the supporting salt may be a lithium salt such as $LiPF_6$, $LiBF_4$, $LiClO_4$ or the like. Among them, it is preferable to use $LiPF_6$. It is preferred that the concentration of the supporting salt is set at 0.7 mol/L to 1.3 mol/L based on the total amount of the nonaqueous electrolyte.

If necessary, the nonaqueous electrolyte used in this step may contain an arbitrary component other than the nonaqueous solvent and the supporting salt as described above unless the arbitrary component severely impairs the effects of the invention. The arbitrary component can be used for one or more purposes such as, e.g., a purpose of improving battery preservability (suppressing a capacity reduction during preservation), a purpose of improving a cycle characteristic, a purpose of improving initial charging-discharging efficiency, a purpose of improving input-output performance, a purpose of increasing a gas generation amount when overcharged, or the like. Examples of the arbitrary component include: a film forming agent such as vinylene carbonate (VC), vinyl ethylene carbonate (VEC), lithium bis(oxalato) borate (LiBOB) or the like; and a gas generating agent such as cyclohexyl benzene (CHB), biphenyl (BP) or the like. Among them, with a view to forming a high-quality (low-resistance and high-durability) film on the surface of the negative electrode active material, it is preferred that the nonaqueous electrolyte contains the film-forming agent.

[S30: Initial Charging Step]

In this step, typically in an ordinary temperature range, the battery assembly constructed as above is charged (initially charged) at least once. In general, an external power supply is connected between the positive electrode (positive electrode terminal) and the negative electrode (negative electrode terminal) of the battery assembly and then the battery assembly is charged (typically, charged at a constant current) to a predetermined voltage. Thus, a part of the nonaqueous electrolyte (e.g., the nonaqueous solvent or the film forming agent) is reduced and decomposed in the negative electrode. A film (SEI film) originating from the nonaqueous electrolyte is formed on the surface of the negative electrode active material. Since the interface between the negative electrode active material and the nonaqueous electrolyte is stabilized by the film, it is possible to suppress decomposition of the nonaqueous electrolyte involved in the charging and discharging performed subsequently.

An arrival voltage (typically, the maximum arrival voltage) between the positive electrode terminal and the negative electrode terminal during the initial charging is not particularly limited because it depends on the kind of active material or nonaqueous solvent used. For example, the arrival voltage may be set to fall within a voltage range that can be exhibited when the SOC of the battery assembly is 65% to 110% (typically, 80% to 110%, e.g., 80% to 105%). For instance, in a battery fully charged at 4.2 V, the voltage between the positive electrode and the negative electrode may be set to fall substantially within a range of 3.8 V to 4.3 V. In the embodiment shown in FIG. 2A, the battery voltage (the final voltage) available after finishing this step (after initially charging the battery assembly) is set to be substantially equal to 4.1 V.

A charging method is not particularly limited. It may be possible to employ, e.g., a method (CC charging) in which the battery, assembly is charged at a constant current until the voltage of the battery assembly reaches the aforementioned voltage or a method (CCCV charging) in which the battery assembly is charged at a constant current until the voltage of the battery assembly reaches the aforementioned voltage and is then charged at a constant voltage. A CC charging rate is not particularly limited. If the CC charging rate is too low, the processing efficiency (work efficiency) tends to decrease. On the other hand, if the CC charging rate is too high, there may be a case where the compactness of a film as formed is insufficient or a case where the positive electrode active material is degraded. For that reason, the CC charging rate may be set to substantially 0.1 C to 5 C (e.g., 0.5 C to 2 C). This makes it possible to form a highly compact film on the surface of the negative electrode active material within a short period of time. The charging may be performed once or may be repeatedly performed twice or more, e.g., with the discharging interposed therebetween. Other operations (e.g., application of pressure and irradiation of ultrasonic waves) capable of accelerating the reduction and decomposition of the nonaqueous electrolyte may be appropriately used in combination within an extent that does not adversely affect the battery characteristics.

[S40: Aging Step]

In this step, the battery assembly subjected to the initial charging (typically, the battery assembly whose SOC is 65% or higher, e.g., 80% or higher) is heated to a high temperature range of about 40° C. or higher (typically, 45° C. or higher, e.g., 50° C. or higher, preferably 60° C. or higher, and more preferably 60±2° C.) and is then kept (left alone) in the high temperature range for a predetermined period of time. This makes it possible to modify the film formed on the surface of the negative electrode active material to a high-quality film (namely, a film of low-resistance and capable of sufficiently suppressing the reaction with the nonaqueous electrolyte). For example, even if metallic alien substances (e.g., Fe particles or Cu particles) are introduced from the outside (typically, the constituent members of a production apparatus), it is possible to dissolve and diffuse the metallic alien substances as metal ions (e.g., Fe ions or Cu ions) and to prevent generation of a minute short-circuit in the battery assembly (typically, in the electrode body). With a view to preventing high temperature degradation, the upper limit value of an aging temperature may be set at, e.g., 80° C. or lower (typically, 75° C. or lower, preferably 70° C. or lower, and more preferably 65° C. or lower). In the embodiment shown in FIG. 2B, the temperature of the battery assembly is maintained at 60° C. As a method of increasing and maintaining the temperature of the battery assembly, it, is possible to use a heating means such as, e.g., a temperature-controlled thermostatic oven or an infrared heater.

The period (time) for keeping the battery assembly in the high temperature range is not particularly limited because it depends on, e.g., the keeping temperature or the components of the nonaqueous electrolyte. Typically, the total time counted from the start of a heating operation may be set to be equal to 5 hours or more (e.g., 5 hours to 48 hours, preferably 10 hours to 24 hours). In the embodiment shown in FIG. 2A, the time period is set to be equal to about 20 hours. In one preferred embodiment, the voltage across the terminals adjusted in the initial charging step or a voltage substantially equal to the voltage across the terminals (e.g., about ±0.5 V) is maintained throughout step S40. For example, in a battery fully charged at 4.2 V, it is preferred that the voltage between the positive electrode and negative electrode is maintained substantially at 3.7 V to 4.3 V (about 4.1 V in the embodiment shown in FIG. 2A) throughout step S40. To this end, a voltage maintaining method such as a CCCV charging method or the like may be employed in step S40.

In one preferred embodiment, the period (left-alone period) from the end of the aging to the start of the next forced discharging is set to be equal to 48 hours or less (typically, 24 hours or less, e.g., 20 hours or less, preferably 10 hours or less, and more preferably 5 hours or less). This makes it possible to minimize the duration of a high voltage state and to restrain the charge carriers from unduly moving toward the non-opposite portion of the negative electrode active material layer. It is therefore possible to shorten the voltage instability period in the subsequent self-discharge test step and to efficiently perform the self-discharge test with a reduced waiting time. The lower limit value of the left-alone period can be set to be equal to, e.g., 3 hours or more (typically, 5 hours or more). This makes it possible to reduce a measurement error and a measurement variation during the self-discharge test and to accurately conduct the self-discharge test. Thus, it is possible to efficiently remove a defective product (a battery assembly in which short-circuits are generated) and to effectively prevent the defective product from flowing toward a subsequent step.

In another preferred embodiment, if the left-alone period falls within a predetermined normal left-alone period, a left-alone temperature T in the left-alone step is set at a predetermined normal setting temperature. On the other hand, if the left-alone period reaches an excessive left-alone period that exceeds the normal left-alone period, the left-alone temperature T is set to be higher than the normal setting temperature depending on the left-alone period in the left-alone step. Thus, even if the left-alone period is unavoidably prolonged due to, e.g., a power failure or a long-term holiday, it is possible to keep the voltage instability period at a level equivalent to that of the normal time without increasing the voltage instability period. Accordingly, the self-discharge test can be conducted within a short period of time.

In a further preferred embodiment, during the left-alone period (between the end of the aging and the start of the next forced discharging), the battery assembly is cooled using, e.g., a temperature-controlled thermostatic oven or a cooling means such as ice-cooling or natural cooling. As one example, in the case where the aging step (S40) is performed at, e.g., about 50° C. to 60° C., a relatively long period of time (e.g., 70 minutes or more) may be required in lowering the temperature of the battery assembly to an ordinary temperature and stabilizing the temperature of the battery assembly. For that reason, if the cooling is started as early as possible after the aging step (S40) is finished, it is possible to stabilize the temperature of the battery assembly within a short period of time and to enhance the work efficiency. In the embodiment shown in FIG. 2B, after the aging step (S40) is finished, the battery assembly is taken out from the thermostatic oven and is left alone (naturally cooled) for 0.5 hour at room temperature (20° C.). By doing so, the temperature of the battery assembly kept at 60° C. during the aging can be reduced to about 40° C.

[S50: Forced Discharging Step]

In one preferred embodiment of the invention disclosed herein, as shown in FIG. 1, the production method further includes a forced discharging step (S50) between the aging step (S40) and the SOC adjusting step (S60). In this step, the battery assembly subjected to the high temperature aging is forcedly discharged. In general, an external power supply is connected between the positive electrode (positive electrode terminal) and the negative electrode (negative electrode terminal) of the battery assembly and then the battery assembly is discharged (typically, discharged at a constant current) to a predetermined voltage.

For example, in a battery fully charged at 4.2 V, the arrival voltage (the final voltage) between the positive electrode terminal and negative electrode terminal may be set to fall within a range of about 1.6 V to 2.3 V (typically, 1.6 V to 2.2 V, e.g., 1.7 V to 2.1 V). In the embodiment shown in FIG. 2A, the battery voltage (the final voltage) available after finishing the step S50 is set to be equal to about 2.0 V.

Figure 3:
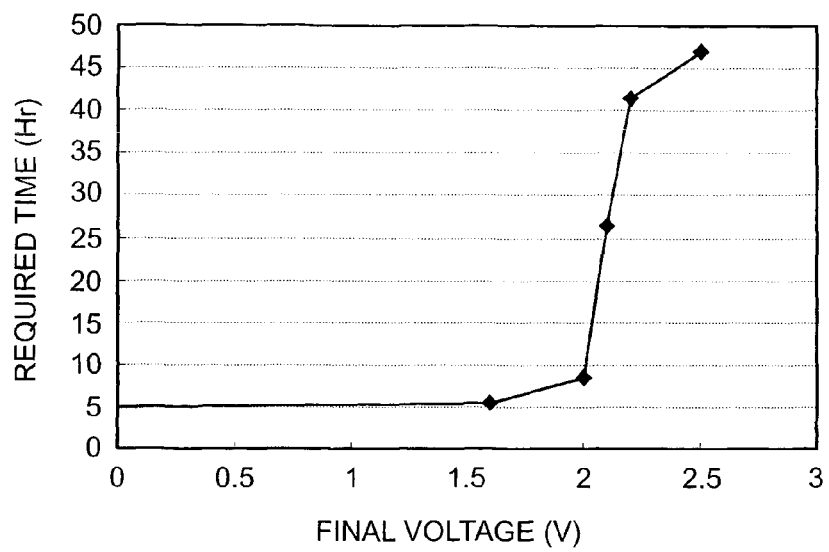
FIG. 3 is a graph illustrating the relationship between the final voltage in a forced discharging step and the time required from the end of the forced discharging to the start of a self-discharge test.

In this regard, description will be made in more detail with reference to FIG. 3. FIG. 3 illustrates the relationship between the final voltage (V) in step S50 and the time required from the end of the forced discharging to the start of the self-discharge test, which was investigated by the inventors who have constituted a lithium-ion secondary battery fully charged at 4.2 V. As is apparent in FIG. 3, if the final voltage in step S50 is set to fall within the aforementioned range, it is possible to shorten the process without deteriorating the quality. That is to say, the electric potential difference between the opposite portion and the non-opposite portion in the negative electrode active material layer is made large by setting the final voltage at 2.3 V or less (preferably 2.2 V or less and more preferably 2.1 V or less) which is far lower than the final voltage of the related art. By doing so, the charge carriers remaining in the non-opposite portion easily escape and the electric potential irregularity in the negative electrode active material layer can be suitably alleviated. This makes it possible to further shorten the production process and to realize the effects of the invention at a higher level. According to the research conducted by the inventors, if the final voltage is set at 2.5 V or higher, it was sometimes the case that the leap of the voltage after the forced discharging is large and a long period of time is required in stabilizing the voltage. This is undesirable because the time required in the production becomes substantially equal to that of the related art. Moreover, if the final voltage is set at 1.6 V or higher (e.g., 1.7 V or higher), it is possible to prevent the electric potential of the negative electrode from becoming too high, as a result of which the negative electrode active material degrades. Furthermore, it is possible to prevent the nonaqueous electrolyte from decomposing (reductively decomposed).

A discharging method in the forced discharging is not particularly limited. It may be possible to employ, e.g., a method (CC discharging) in which the battery assembly is discharged at a constant current until the voltage of the battery assembly reaches the aforementioned voltage or a method (CCCV discharging) in which the battery assembly is discharged at a constant current until the voltage of the battery assembly reaches the aforementioned voltage and is then discharged at a constant voltage. A CC discharging rate is not particularly limited. If the CC discharging rate is too high, there may be a case where the voltage is unduly decreased in a local area and the nonaqueous electrolyte is electrochemically decomposed. For that reason, the CC discharging rate may be set substantially at 0.01 C to 5 C (e.g., 0.05 C to 3 C). For example, in a battery assembly having a theoretical capacity of about 25 Ah, the discharging current may be set at a current value of about 0.5 A to 75 A.

The discharging may be performed only once or may be repeatedly performed twice or more, e.g., at a specified time interval. In that case, the discharging rate may remain constant or may differ at the respective discharging cycles. In one preferred embodiment, the discharging rate is largest at the first charging cycle and is gradually reduced at the second and third discharging cycles. According to this embodiment, it is possible to stabilize the voltage of the battery assembly within a short period of time. In the case where the forced discharging is performed a multiple number of times, the time interval of the forced discharging varies depending on the discharging rate and may be set at, e.g., several ten seconds to several ten minutes (typically, several minutes). For example, in the embodiment shown in FIG. 2A, the first cycle of discharging is performed at a constant current of 60 A (2.4 C). The second and subsequent cycles of discharging are performed at constant currents of 20 A (0.75 C), 5 A (0.2 C) and 1 A (0.04 C) to 2.0 V at an interval of 5 minutes.

In one preferred embodiment, the battery assembly is cooled while discharging the battery assembly. In other words, the battery assembly is cooled using the time required in the discharging. From the viewpoint of workability or the like, as shown in FIG. 2B, the battery assembly may be continuously cooled from the aforementioned left-alone period (cooling period). In the embodiment disclosed herein, the battery assembly is continuously kept (naturally cooled) under an environment of room temperature (20° C.) from the left-alone period. This makes it possible to significantly reduce (or remove) the waiting time required in stabilizing the temperature of the battery assembly in the subsequent step and to greatly increase the production efficiency.

In another preferred embodiment, during step S50, the temperature of the battery assembly is kept in a temperature range of 20° C. or higher and 55° C. or lower. By keeping the temperature of the battery assembly in the aforementioned range, it is possible to shorten the process without deteriorating the quality. That is to say, if the battery assembly is forcedly discharged while keeping the battery assembly at room temperature or higher, namely 20° C. or higher, it is possible to reduce a diffusion resistance in the negative electrode active material layer. This enables the charge carriers to smoothly move. Thus, the electric potential irregularity in the negative electrode active material layer can be alleviated in a more suitable manner. As a result, it is possible to further shorten the subsequent down time. By setting the temperature of the battery assembly at 55° C. or lower, it becomes possible to suppress high temperature degradation of the battery assembly. Moreover, it is possible to eliminate (or reduce) the time required in stabilizing the temperature of the battery assembly in the subsequent step. In the aforementioned temperature range, the temperature may be constant or may not be constant throughout the step S50.

Figure 4:
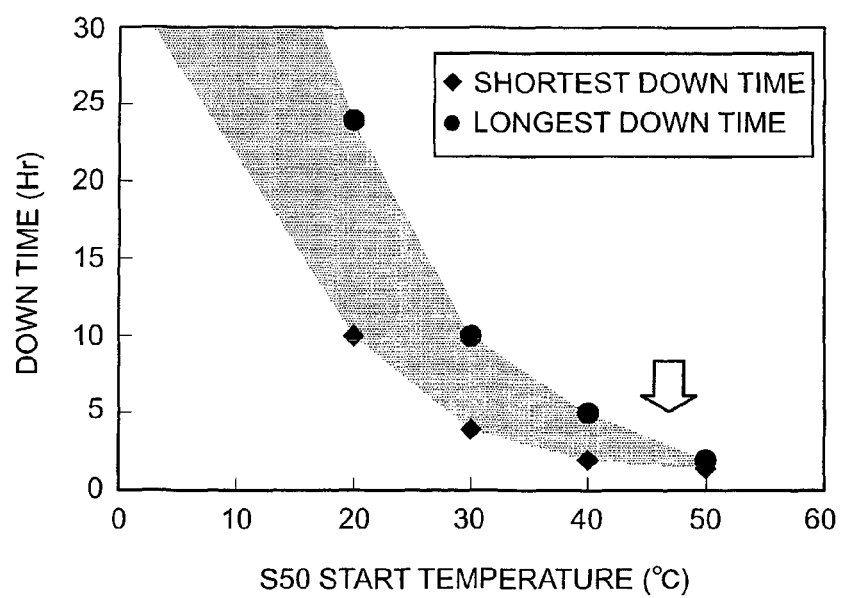
FIG. 4 is a graph illustrating the relationship between the temperature of the battery assembly at the start of the forced discharging step and the down time after the forced discharging.

In one preferred embodiment, a down time is provided between the end of the forced discharging and the start of the next SOC adjustment. The battery assembly subjected to the forced discharging is in such a state that the voltage is very low (in other words, the electric potential of the negative electrode is very high). Thus, if the battery assembly is kept (left alone) in this state, it is possible to maintain a state in which the electric potential difference between the opposite portion and the non-opposite portion is large. As a consequence, the charge carriers remaining in the non-opposite portion can be smoothly diffused toward the opposite portion using the large electric potential difference as a driving force. This makes it possible to appropriately alleviate the electric potential irregularity in the negative electrode active material layer. The down time is usually set at 0.5 hours or more (e.g., 1 hour or more) and 24 hours or less (typically, less than 24 hours, e.g., 20 hours or less, preferably 10 hours or less, and more preferably 5 hours or less). On the related technology, description will be made with reference to FIG. 4. FIG. 4 illustrates the relationship between the temperature (° C.) of the battery assembly at the start time of the forced discharging step (S50) and the down time (Hr) after the forced discharging, which was investigated by the inventors who have constituted a lithium-ion secondary battery fully charged at 4.2 V. As is apparent in this figure, if the temperature of the battery assembly at the start time of the forced discharging step (S50) and the down time after the forced discharging are adjusted to fall within a black-painted range, it is possible to stably produce a battery within a time period shorter than that of the related art. For example, if the temperature of the battery assembly at the start time of the forced discharging step is set at 50° C. and if the down time after the forced discharging is set at 1.5 hours, the time required from the end of the forced discharging to the start of the self-discharge test can be made to be equal to about 3.5 hours. Furthermore, the voltage rising period in the self-discharge test can be made to be equal to 0 days (can be substantially eliminated). In the method of the related art, the voltage rising period in the self-discharge test is about 2 to 3.5 days. Thus, according to the method disclosed herein, it becomes possible to significantly shorten the process. In another preferred embodiment, during this period, the temperature of the battery assembly is decreased to an ordinary temperature range and is stabilized at that temperature. This makes it possible to reduce variations of measured values in the self-discharge test and to accurately (stably) perform the self-discharge test.

[S60: SOC Adjusting Step]

In this step, the battery assembly subjected to the forced discharging is adjusted to a predetermined SOC. More specifically, the SOC is adjusted such that the residual capacity percentage of the battery assembly represented by the equation, residual capacity percentage (%)=[($\Sigma$ charging capacities−$\Sigma$ discharging capacities)/$\Sigma$ charging capacities]× 100, becomes 11.5% or more and 14% or less. In this equation, the $\Sigma$ charging capacities represents the total capacity of the charging performed from the initial charging step (S30) to the SOC adjusting step (S60). The $\Sigma$ discharging capacities represents the total capacity of the discharging performed from the initial charging step (S30) to the SOC adjusting step (S60). For example, in the embodiment shown in FIG. 2A, if the $\Sigma$ charging capacities=(one time charging capacity in the initial charging step (S30))+(one time charging capacity in the SOC adjusting step (S60))=27.0 Ah and if the $\Sigma$ discharging capacities=(four time discharging capacities in the forced discharging step (S50))=23.5 Ah, the residual capacity percentage is calculated as being equal to 12.9%. The SOC may be adjusted such that the residual capacity percentage becomes equal to this value. By adjusting the residual capacity percentage to fall within the aforementioned range, it is possible to make the self-discharge test period (specifically, the voltage instability period) shorter than that of the related art. For example, according to the embodiment shown in FIG. 2A, it is possible to shorten the voltage instability period from more than 7 days of the related art to within 2 days.

At this time, the SOC of the battery assembly is adjusted to become smaller than that of the related art. In general, the SOC of the battery assembly is adjusted to become 10% or less, typically 7% or less, preferably 5% or less, e.g., 1% to 5%. For example, in a battery mounted to a motor vehicle such as a plug-in hybrid vehicle (PHV) or the like, a high power density or a high durability may be required over a wide SOC region. However, in general, the power density of a nonaqueous secondary battery tends to decrease as the SOC becomes lower (as the battery capacity becomes smaller). For that reason, in a vehicle-mounted battery (especially, a PHV-mounted battery), the performance particularly in a low SOC region (e.g., a region where the SOC is 30% or less) is likely to become a problem. By evaluating the self-discharge characteristics in the aforementioned SOC range, it is possible to precisely evaluate the battery performance in the low SOC region. According to the research conducted by the inventors, by adjusting the SOC into a low SOC state in step S60, it is possible to perform the self-discharge test within a time period shorter than that of the related art.

As is apparent from the equation described above, the adjustment of the residual capacity percentage can be performed, for example, by adjusting the arrival voltage, the charging current value, the charging time, the charging frequency and the like in the initial charging step (S30); by adjusting the left-alone period after the aging step; by adjusting the arrival voltage (final voltage), the discharging current value, the discharging time, the discharging frequency and the like in the forced discharging step (S50); by adjusting the down time after the forced discharging step; or, by adjusting the SOC in the SOC adjusting step (S60).

Figure 5:
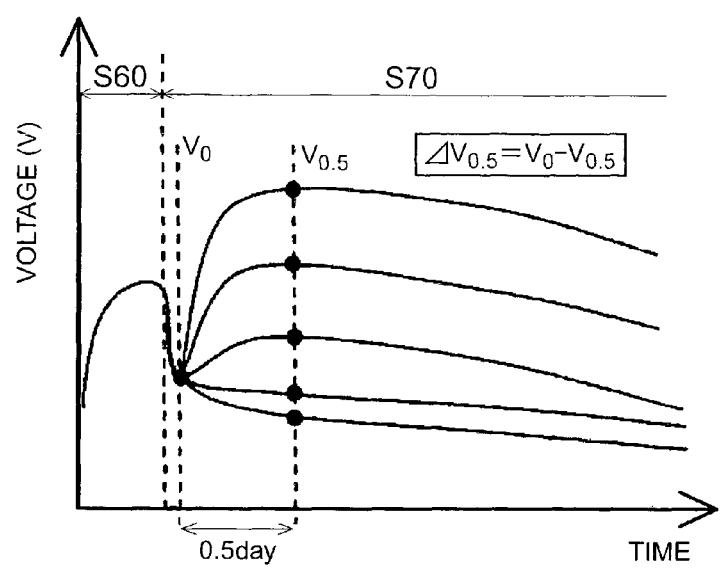
FIG. 5 is an explanatory view schematically illustrating a voltage change in the self-discharge test.
Figure 6:
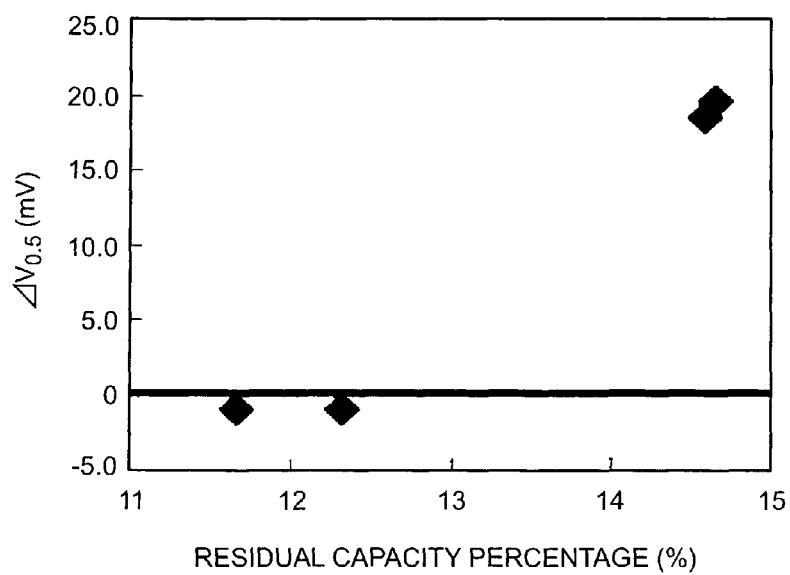
FIG. 6 is a graph illustrating the relationship between a residual capacity percentage and $\Delta V_{0.5}$ in the self-discharge test.

The relationship between the residual capacity percentage and the self-discharge test period (specifically, the voltage instability period) will now be described in more detail with reference to FIGS. 5 to 8. In order to shorten the voltage instability period in the self-discharge test step (S70), the inventors have conducted research by paying attention to two viewpoints of: (1) suppressing a voltage rise in the self-discharge test; and (2) suppressing a voltage change in the battery assembly. First, description will be made on viewpoint (1). FIG. 5 is an explanatory view schematically illustrating a voltage change, in the self-discharge test step (S70). That is to say, the inventors have found through extensive research that the behavior (pattern) of the voltage during the self-discharge test varies depending on the difference in the residual capacity percentage. More specifically, the inventors have discovered that the behavior of the voltage is largely divided into a case where the voltage of the battery assembly after the adjustment of the SOC is first decreased to $V_0$ due to an overvoltage and is then sharply increased and a case where the voltage of the battery assembly does not exhibit such a behavior. Thus, the inventors have conceived that the voltage rise is suppressed by using, as an index for controlling the residual capacity percentage, a difference ($\Delta V_{0.5}$) between an electric potential ($V_0$) available at a point (typically, an inflection point) at which the voltage is decreased due to an overvoltage and an electric potential ($V_{0.5}$) available 0.5 days after the $V_0$ has appeared. FIG. 6 illustrates the relationship between the residual capacity percentage and the $\Delta V_{0.5}$, which was, investigated by the inventors who have constructed a lithium-ion secondary battery fully charged at 4.2 V. As illustrated in FIG. 6, if the residual capacity percentage before the self-discharge test is set at 14% or less (e.g., less than 14%, preferably 13.5% or less, and more preferably less than 13.5%), it becomes possible to suppress the voltage rise ($\Delta V_{0.5}$) in the self-discharge test step (S70) (to, e.g., 10 mV or less, preferably 5 mV or less, and more preferably 0 mV or less). According to the research conducted by the inventors, the voltage instability period in the self-discharge test step (S70) can be shortened from 2 to 3.5 days of the related art to 0 days (zero waiting days).

Figure 7A:
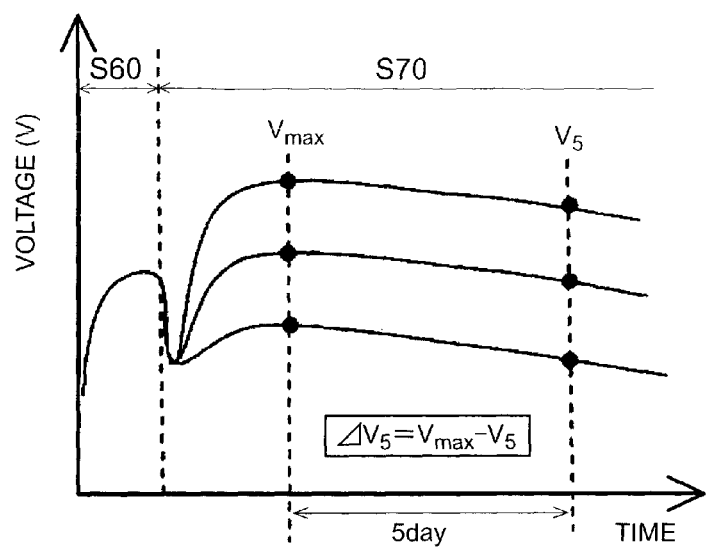
FIG. 7A is an explanatory view schematically illustrating a voltage change where a battery voltage rises at an initial stage of the self-discharge test.
Figure 7B:
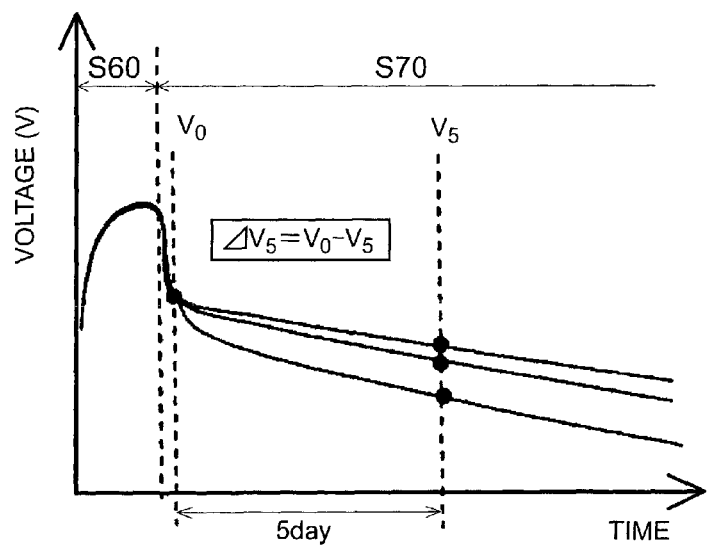
FIG. 7B is an explanatory view schematically illustrating a voltage change where a battery voltage drops at an initial stage of the self-discharge test.
Figure 8:
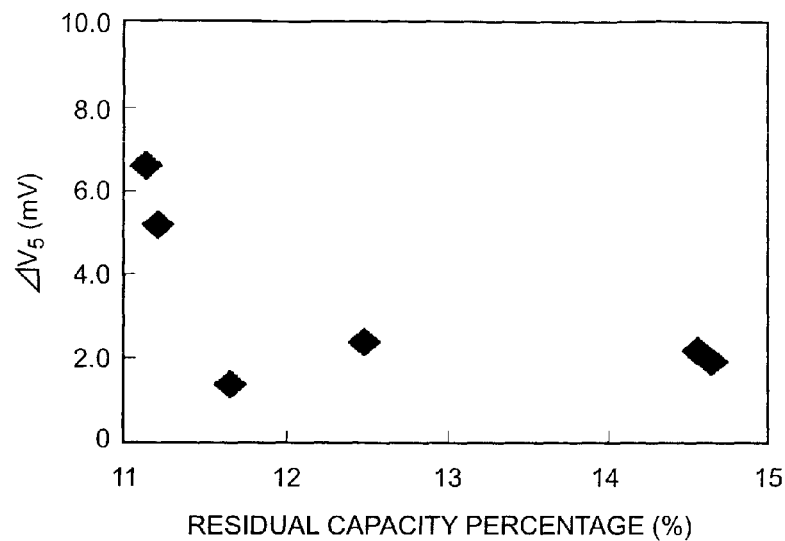
FIG. 8 is a graph illustrating the relationship between the residual capacity percentage and $\Delta V_5$ in the self-discharge test.

Next, description will be made on viewpoint (2) ("suppressing a voltage change in the battery assembly"). FIGS. 7A and 7B are views in which the self-discharge test step (S70) shown in FIG. 5 is divisionally illustrated on a behavior-by-behavior basis. FIG. 7A illustrates a case where the battery voltage rises at the initial stage of the self-discharge test. FIG. 7B illustrates a case where the battery voltage drops at the initial stage of the self-discharge test. The inventors have conceived that a voltage change during the specified 5 days of the self-discharge test step (S70) is used as an index for suppressing voltage fluctuation. That is to say, in the case where the battery voltage rises at the initial stage of the self-discharge test, as illustrated in FIG. 7A, a difference ($\Delta V_5$) between a maximum voltage ($V_{MAX}$) and an electric potential ($V_5$) available 5 days after the maximum voltage ($V_{MAX}$) has appeared is used as the index. In the case where the battery voltage drops at the initial stage of the self-discharge test, as illustrated in FIG. 7B, a difference ($\Delta V_5$) between an electric potential ($V_0$) available at a point (typically, an inflection point) at which the voltage is decreased due to an overvoltage and an electric potential ($V_5$) available 5 days after the $V_0$ has appeared is used as an index for suppressing a voltage rise. Furthermore, the inventors have conceived that the voltage fluctuation is suppressed such that the $\Delta V_5$ becomes smaller. FIG. 8 illustrates the relationship between the residual capacity percentage and the $\Delta V_5$, which was investigated by the inventors who have constructed a lithium-ion secondary battery fully charged at 4.2 V. As illustrated in FIG. 8, if the residual capacity percentage before the self-discharge test is set at 11.5% or more (e.g., more than 11.5%, preferably 12% or more, and more preferably more than 12%), it becomes possible to suppress the voltage fluctuation in the self-discharge test step (S70) to a smaller value (e.g., 4 mV or less). As described above, according to the invention disclosed herein, by satisfying viewpoints (1) and (2), it becomes possible to make the time required in the self-discharge test step (S70) far shorter than that of the related art.

[S70: Self-Discharge Test Step]

In this step, typically, the battery assembly adjusted to the specified SOC is self-discharged by leaving the battery assembly alone in an ordinary temperature range (e.g., 20° C. to 25° C.). Then, a voltage drop amount is measured. This makes it possible to accurately evaluate and grasp the presence or absence of internal short-circuits caused by certain influences originating from the production conditions. It is preferred that the temperature of the battery assembly during the self-discharge test is always kept constant throughout the test using, e.g., a thermostatic oven. This makes it possible to accurately perform the test.

[S80: Non-Defective Product Determining Step]

In this step, the quality of the battery assembly (the presence or absence of short-circuits) is determined based on the result (the voltage drop amount) obtained in the self-discharge test step. More specifically, a reference value for non-defective product determination is first set based on the measurement result of the voltage drop amount. While a method of setting the reference value is not particularly limited, it is possible to employ, e.g., an arithmetic mean value or a median of voltage drop amounts of a plurality of battery assemblies. Then, a difference between the reference value and the voltage drop amount of each of the battery assemblies is calculated. If the difference is equal to or smaller than a predetermined threshold value, it is determined that the battery assembly has "no internal short-circuit". If the difference exceeds the predetermined threshold value, it is determined that the battery assembly has "an internal short-circuit". The threshold value is not particularly limited because it depends on the specifications of a target battery. For example, the threshold value can be set at a value equivalent to $2\sigma$ to $4\sigma$ (where $\sigma$ denotes a standard deviation). Based on this determination result, the battery assembly determined to have "an internal short-circuit" is removed. This makes it possible to prevent a defective product from flowing toward the subsequent step and to provide a highly reliable battery. As described above, according to the technology disclosed herein, it is possible to produce a highly reliable battery within a shorter period of time.

The schematic configuration of the nonaqueous secondary battery according to one embodiment of the invention will now be described in detail by taking, as one example, a nonaqueous secondary battery (a cell) of the type in which a flatly wound electrode body (a wound electrode body) and a nonaqueous electrolyte are contained in a flat rectangular-prallelepiped (box-shaped) container (battery case). In the figures described below, similar features will be designated by like reference signs. Duplicate description thereon will be omitted or simplified. The dimensional relationship (length, width, thickness and the like) in the respective figures does not necessarily reflect the actual dimensional relationship.

Figure 9:
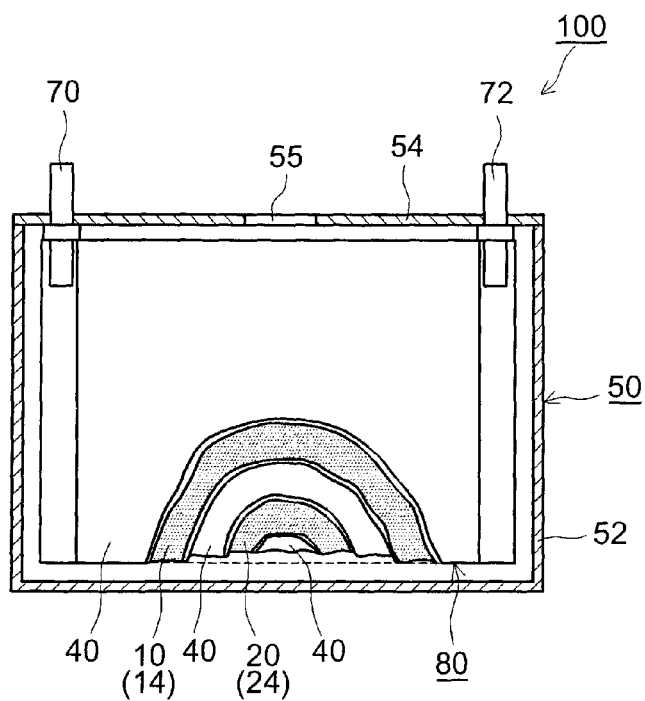
FIG. 9 is a sectional view schematically illustrating a configuration of a nonaqueous secondary battery according to one embodiment of the invention.

FIG. 9 is a vertical sectional view schematically illustrating a cross-sectional structure of a nonaqueous secondary battery 100. As illustrated in FIG. 9, the nonaqueous secondary battery 100 has such a configuration that an electrode body (wound electrode body) 80 of the type in which an elongated positive electrode sheet 10 and an elongated negative electrode sheet 20 are flatly wound with an elongated separator sheet 40 interposed therebetween is contained in a flat box-shaped battery case 50 together with a nonaqueous electrolyte (not shown).

The battery case 50 includes a flat rectangular-parallelepiped (box-shaped) battery case body 52 with an upper end portion thereof opened, and a cover 54 configured to close the opening of the battery case body 52. An external-connection-purpose positive electrode terminal 70 electrically connected to a positive electrode of the wound electrode body 80 and an external-connection-purpose negative electrode terminal 72 electrically connected to a negative electrode of the wound electrode body 80 are installed on the top surface of the battery case 50 (namely, the cover 54). Just like the battery case of the nonaqueous secondary battery of the related art, the cover 54 is provided with a safety valve 55 for discharging a gas generated in the battery case 50 outside the battery case 50.

Figure 10:
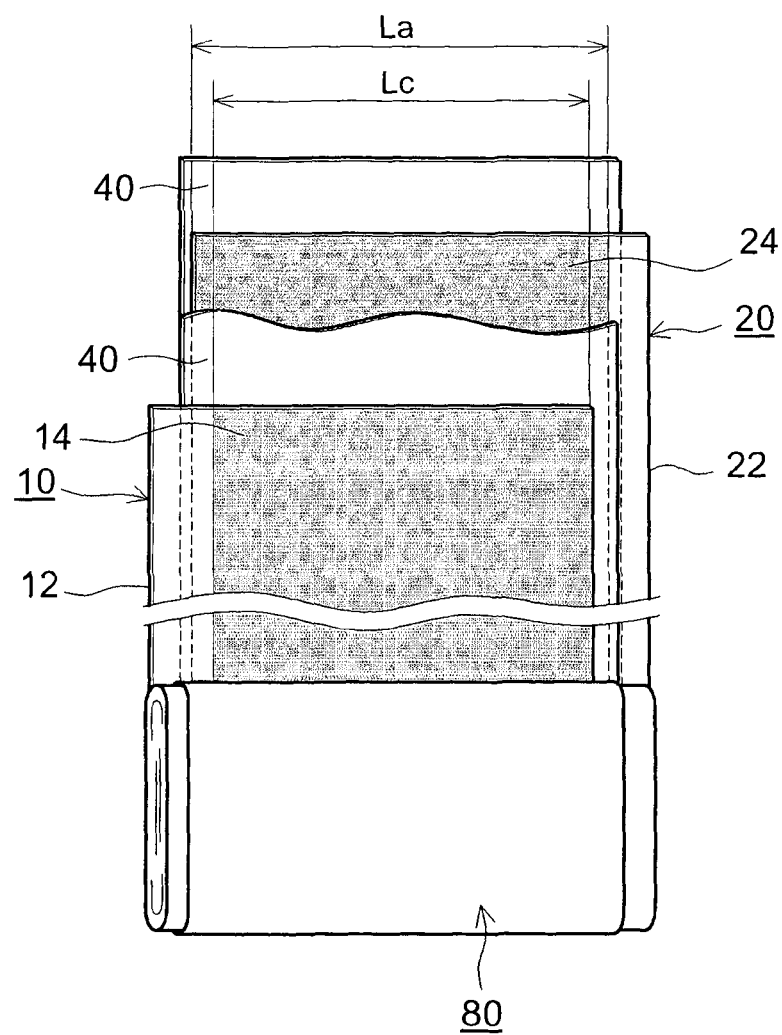
FIG. 10 is a schematic diagram illustrating a wound electrode body shown in FIG. 9.

FIG. 10 is a schematic diagram illustrating the configuration of the wound electrode body 80 shown in FIG. 9. As illustrated in FIG. 10, the wound electrode body 80 according to the present embodiment includes an elongated sheet-like positive electrode (positive electrode sheet) 10 and an elongated sheet-like negative electrode (negative electrode sheet) 20 at a stage prior to assembling the same. The positive electrode sheet 10 includes an elongated positive electrode current collector 12 and a positive electrode active material layer 14 formed on at least one surface (typically, both surfaces) of the positive electrode current collector 12 along the longitudinal direction. The negative electrode sheet 20 includes an elongated negative electrode current collector 22 and a negative electrode active material layer 24 formed on at least one surface (typically, both surfaces) of the negative electrode current collector 22 along the longitudinal direction. An insulation layer for preventing the positive electrode active material layer 14 and the negative electrode active material layer 24 from making direct contact with each other is disposed between the positive electrode active material layer 14 and the negative electrode active material layer 24. Herein, two elongated sheet-like separators (separator sheet) 40 are used as the insulation layer. The wound electrode body 80 can be fabricated by, e.g., longitudinally winding a laminated body in which the positive electrode sheet 10, the separator sheet 40, the negative electrode sheet 20 and the separator sheet 40 are overlapped in the named order and then laterally pressing and crushing the obtained wound body into a flat shape.

A wound core portion, in which the positive electrode active material layer 14 formed on the surface of the positive electrode current collector 12 and the negative electrode active material layer 24 formed on the surface of the negative electrode current collector 22 are overlapped and densely laminated with each other, is formed in the central portion of the wound electrode body 80 in a width direction defined as a direction extending from one end portion toward the opposite end portion in a winding axis direction of the wound electrode body 80. In both end portions in the winding axis direction of the wound electrode body 80, a positive electrode active material layer non-forming portion of the positive electrode sheet 10 and a negative electrode active material layer non-forming portion of the negative electrode sheet 20 protrude outward from the wound core portion. A positive current collecting plate is installed in the positive-electrode-side protrusion portion, while a negative current collecting plate is installed in the negative-electrode-side protrusion portion. The positive current collecting plate and the negative current collecting plate are electrically connected to the positive electrode terminal 70 (see FIG. 9) and the negative electrode terminal 72 (see FIG. 9), respectively.

In the invention disclosed herein, a width La of the negative electrode active material layer 24 is set to be larger than a width Lc of the positive electrode active material layer 14. For this reason, when the positive electrode sheet 10 and the negative electrode sheet 20 overlap with each other, the negative electrode active material layer 24 includes an opposite portion that is opposite to the positive electrode active material layer 14 and a non-opposite portion that is not opposite to the positive electrode active material layer 14. When charge carriers are stored in the non-opposite portion, metal precipitation on the negative electrode can be effectively prevented. However, if the non-opposite portion is too wide, the irreversible capacity increases, as a result of which the cycle characteristics or the storage characteristics may decrease. For that reason, it is preferred that a difference between the La and the Lc is 20 mm or less (e.g., 10 mm or less). It is particularly preferred that both the left and right ends of the La protrude about 1 mm to 5 mm (e.g., 1 mm to 3 mm) from the Lc, respectively. In other words, it is preferred that a position difference between the positive electrode active material layer 14 and the negative electrode active material layer 24 is 1 mm to 5 mm (e.g., 1 mm to 3 mm).

The nonaqueous secondary battery (typically, a lithium-ion secondary battery) disclosed herein can be used in various applications and is characterized by high battery performance (e.g., a high energy density) and superior reliability. For example, the nonaqueous secondary battery is high in initial capacity and can exhibit a superior input-output density even in a low SOC region. Taking advantage of such properties, the nonaqueous, secondary battery can be suitably used as, e.g., a power source (a driving power supply) mounted to a motor vehicle. The kind of motor vehicle is not particularly limited. Typical examples of the motor vehicle include automobiles such as a plug-in hybrid vehicle (PHV), a hybrid vehicle (HV), an electric vehicle (EV) and the like. Thus, according to another embodiment, there is provided a motor vehicle that includes any of the nonaqueous secondary batteries (which may be a battery pack) disclosed herein.

Certain embodiments of the invention will now be described. However, the invention is not limited to these specific embodiments.

A slurry composition was produced by mixing $Li_{1.00}Ni_{0.38}Co_{0.32}Mn_{0.30}O_2$ powder as positive electrode active material powder, acetylene black (AB) and graphite (trade name "KS4" made by TIMCAL Ltd.) as a conductive material and polyvinylidene fluoride (PVdF) as a binder with N-methylpyrrolidone (NMP) at a mass ratio of 91:3:3:3. A positive electrode active material layer was formed by coating the composition on an elongated aluminum foil (a positive electrode current collector) having a thickness of about 15 μm. A sheet-like positive electrode (a positive electrode sheet) was produced by drying and pressing the obtained positive electrode. Then, a slurry composition was produced by mixing amorphous coat graphite powder as a negative active material, styrene-butadiene rubber (SBR) and carboxymethyl cellulose (CMC) with ion-exchanged water at a mass ratio of 98.3:1.0:0.7. A negative electrode active material layer was formed by coating the composition on an elongated copper foil (a negative electrode current collector) having a thickness of about 10 μm. A sheet-like negative electrode (a negative electrode sheet) was produced by drying and pressing the obtained negative electrode.

Then, the positive electrode sheet and the negative electrode sheet thus produced were overlapped and wound with a separator (having a three-layer structure in which polypropylene (PP) layers are laminated on both surfaces of a polyethylene (PE) layer) interposed therebetween. The obtained wound electrode body was laterally pressed and crushed into a flat shape. Then, a positive electrode terminal was bonded by welding to an end portion of the positive electrode current collector of the wound electrode body. A negative electrode terminal was bonded by welding to an end portion of the negative electrode current collector of the wound electrode body. The electrode body was contained in a battery case. A nonaqueous electrolyte was injected into the battery case. The nonaqueous electrolyte used at this time was prepared by dissolving $LiPF_6$ as an electrolyte at a concentration of about 1 mol/L in a mixed solvent which contains ethylene carbonate (EC), ethyl methyl carbonate (EMC) and dimethyl carbonate (DMC) at a volume ratio of 3:4:3 and by adding vinylene carbonate at a ratio of 0.75% by mass of the total amount of the nonaqueous electrolyte, cyclohexyl benzene at a ratio of 4% by mass of the total amount of the nonaqueous electrolyte and biphenyl at a ratio of 1% by mass of the total amount of the nonaqueous electrolyte. Then, a cover was mounted to an opening of the battery case and was bonded to the battery case by welding, thereby constructing a battery assembly (having a capacity ratio ($C_N/C_P$) of 1.36 and a rated capacity of 25 Ah) according to Example 1.

Next, the constructed battery assembly was pinched with a jig and was pressed and confined such that a confining pressure becomes 400 kgf. The confined battery assembly was subjected to constant current charging at a constant current of 20 A until the voltage across the positive electrode terminal and the negative electrode terminal reaches 3.95 V and was then subjected to constant voltage charging until the current becomes 0.1 A at the aforementioned voltage (initial charging). Then, the battery assembly subjected to the initial charging was put into a temperature-controlled thermostatic oven and was heated to 60° C. The battery assembly was subjected to aging under a temperature environment of 60° C. until the elapsed time from the start of heating becomes 20 hours. Then, the battery assembly was cooled to 40° C. over 0.5 hours. Then, constant current discharging was performed at a constant current of 60 A until the voltage across the positive electrode terminal and the negative electrode terminal reaches 2.0 V (forced discharging). An interval capacity and an IV resistance were measured. Then, the battery assembly was adjusted to 3.3 V (a state in which the SOC is 3%). Thereafter, the battery assembly was self-discharged by leaving the same alone for 5 days. A voltage drop amount was calculated by subtracting a voltage value available after the self-discharging from a voltage value available before the self-discharging.

Based on the aforementioned Example 1, at least one of the following conditions: (a) the left-alone period (cooling period) after the aging; (b) the final voltage during the forced discharging; (c) the discharging frequency during the forced discharging; (d) the discharging current value during the forced discharging; (e) the down time after the forced discharging; and (f) the voltage during the adjustment of the SOC, was changed to thereby build battery assemblies of Examples 2 to 32 (31 cells) which differ in residual capacity percentage from one another. Then, the residual capacity percentages of the respective battery assemblies and the voltage change during the self-discharge test were checked.

Figure 11:
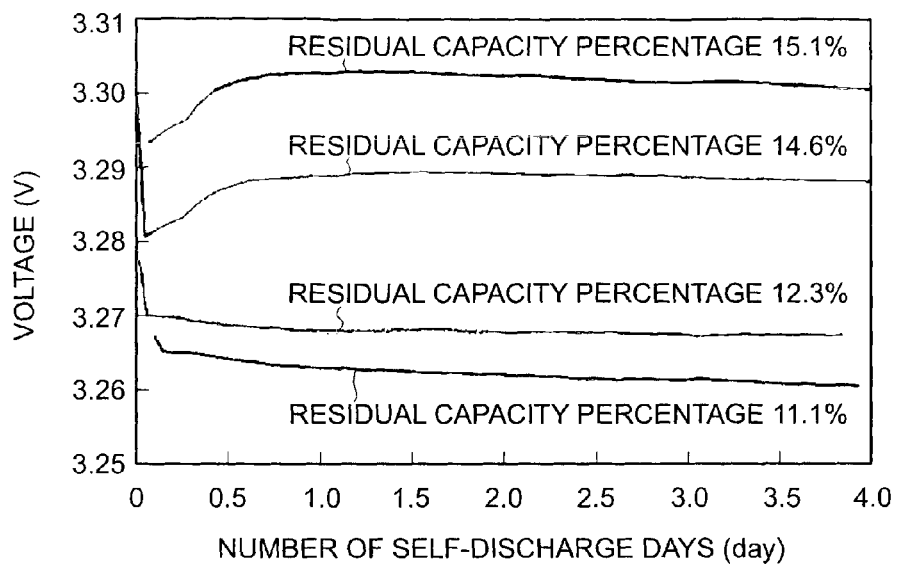
FIG. 11 is a graph illustrating the relationship between the number of test days of the self-discharge test and the voltage.
Figure 12:
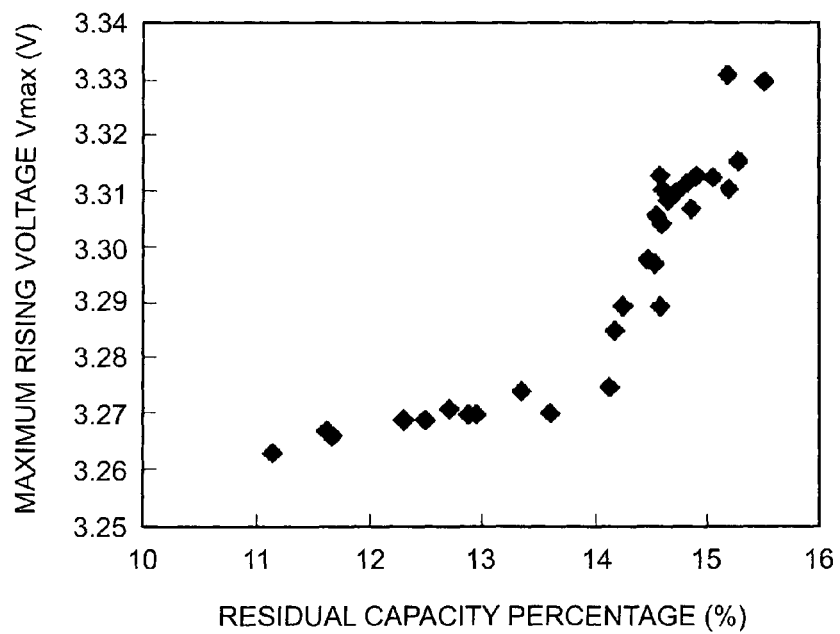
FIG. 12 is a graph illustrating the relationship between the residual capacity percentage and the maximum voltage value in the self-discharge test.

As one example, FIG. 11 illustrates the relationship between the number of test days of the self-discharge test and the voltage. It can be noted that, if the residual capacity percentage is too small (typically, less than 11.5%, e.g., less than 12%, particularly less than 12.3%), the voltage change (ΔV) during the self-discharge grows larger and a long period of time is required until the voltage becomes stable. FIG. 12 illustrates the relationship between the residual capacity percentage and the maximum voltage value in the self-discharge test. It can be noted that, if the residual capacity percentage is too large (typically, more than 14%, e.g., more than 13.5%, particularly more than 13%), the maximum rise voltage grows higher and the voltage instability period (voltage rise period) becomes longer.

While concrete embodiments of the invention have been described in detail, these are nothing more than examples and are not intended to limit the invention. The invention encompasses various modifications and changes of the concrete embodiments exemplified above.

The invention claimed is:

1. A method of producing a nonaqueous secondary battery, comprising:
preparing an electrode body which includes a positive electrode having a positive electrode active material layer and a negative electrode having a negative electrode active material layer, wherein a surface area of the negative electrode active material layer is larger than a surface area of the positive electrode active material layer and wherein the negative electrode active material layer includes an opposite portion which is opposite to the positive electrode active material layer and a non-opposite portion which is not opposite to the positive electrode active material layer;
constructing a battery assembly with the electrode body and a nonaqueous electrolyte;
initially charging the battery assembly;
aging the battery assembly at 40° C. or higher;
adjusting a residual capacity percentage of the battery assembly to 11.5% or more and 14% or less, based on the following equation:

$$\text{Residual capacity percentage (\%)} = \frac{\left(\sum \text{charging capacities} - \sum \text{discharging capacities}\right)}{\sum \text{charging capacities}} \times 100,$$

where the Σ charging capacities and the Σ discharging capacities respectively represent a total sum of charging capacities and a total sum of discharging capacities from the constructing the battery assembly to the adjusting the residual capacity percentage;
self-discharging the battery assembly and measuring a voltage drop amount after the adjusting the residual capacity percentage; and
determining a quality of the battery assembly based on the voltage drop amount.

2. The method according to claim 1, further comprising:
forcedly discharging the battery assembly between the aging and the adjusting the residual capacity percentage, wherein
the battery assembly is kept at 60° C. or higher during the aging, and
the battery assembly is kept in a temperature range of 20° C. or higher and 55° C. or lower during the forcedly discharging the battery assembly.

3. The method according to claim 2, wherein
the battery assembly is discharged to 1.6 V or higher and 2.3 V or lower during the forcedly discharging the battery assembly.

4. The method according to claim 2, wherein
a time period from an end of the aging to a start of the forcedly discharging the battery assembly is 24 hours or less.

5. The method according to claim 1, wherein
an SOC of the battery assembly is adjusted to 10% or less when the adjusting the residual capacity percentage is finished.

6. The method according to claim 1, wherein
the battery assembly is charged to 65% or more and 110% or less by SOC during the initially charging the battery assembly, and
the aging is performed for at least 5 hours.

7. The method according to claim 1, wherein
the quality of the battery assembly corresponds to presence or absence of an internal short-circuit which is determined depending on whether a difference between a reference value for quality determination and the voltage drop amount is equal to or smaller than a predetermined threshold value.

* * * * *